United States Patent [19]

Lehovec

[11] 3,921,193

[45] *Nov. 18, 1975

[54] INDUCED CHARGE DEVICE

[75] Inventor: Kurt Lehovec, Williamstown, Mass.

[73] Assignee: Sprague Electric Company, North Adams, Mass.

[ * ] Notice: The portion of the term of this patent subsequent to Feb. 16, 1988, has been disclaimed.

[22] Filed: Feb. 16, 1971

[21] Appl. No.: 115,365

Related U.S. Application Data

[63] Continuation-in-part of Ser. No. 749,651, Aug. 2, 1968, Pat. No. 3,564,355, which is a continuation-in-part of Ser. No. 703,958, Feb. 8, 1968, Pat. No. 3,473,032.

[52] U.S. Cl. .................... 357/23; 357/24; 307/304
[51] Int. Cl.$^2$ .................... H01L 29/78
[58] Field of Search .................... 317/235; 307/304

[56] References Cited

UNITED STATES PATENTS

| | | | |
|---|---|---|---|
| 2,900,531 | 8/1959 | Wallmark | 317/235 |
| 3,355,598 | 11/1967 | Tuska | 317/235 |
| 3,456,168 | 7/1969 | Tatom | 317/235 |
| 3,513,042 | 5/1970 | Hagon | 317/235 |
| 3,564,355 | 2/1971 | Lehovec | 317/235 |

OTHER PUBLICATIONS

*Electronics* "Overlap key to GE's Charge-Coupled Device" Nov 9, 1970, pp. 33 and 34.

*Electronics* "New MOS Technique Points Way to Junctionless Devices" by Altman, May 11, 1970, pp. 112–118.

*Primary Examiner*—Martin H. Edlow
*Attorney, Agent, or Firm*—Connolly and Hutz

[57] ABSTRACT

A semiconducting structure comprising at least three contiguous charge regions induced by electrodes insulated from each other and from the semiconductor, which is operable as a bipolar transistor, as a field effect transistor, or as a generally lateral charge transfer device, depending on the potentials applied to the inducing electrodes.

1 Claim, 13 Drawing Figures

INDUCED CHARGE DEVICE

CROSS REFERENCE TO RELATED APPLICATIONS

This application is a continuation-in-part of application Ser. No. 749,651 filed Aug. 2, 1968 and issued on Feb. 16, 1971 as U.S. Pat. No. 3,564,355, which in turn is a continuation-in-part of application Ser. No. 703,958 filed Feb. 8, 1968 and issued on Oct. 14, 1969 as U.S. Pat. No. 3,473,032.

BACKGROUND OF INVENTION

This invention relates to a device for shifting induced charge regions in an underlying body to different positions for adaptation to desired circuit functions. More particularly, this invention relates to devices based on the transfer of induced charge along the surface of a semiconducting device by shifting the potential between closely spaced charge inducing electrodes spaced from said surface.

Three terminal semiconducting charge transfer devices in the broadest sense are known as transistors. Ordinarily, transistors depend on conductivity regions having positive or negative charge carriers, depending on chemical dopant impurity added permanently to the semiconductor. The ionized dopant impurities provide for neutralization of charge of free charge carriers, electrons or holes, as the case may be. Bipolar transistors and unipolar junction field effect transistors depend on contiguous chemically doped p- and n-regions. Insulated gate field effect transistors utilize an induced charge region along the surface of a semiconductor to bridge the conduction gap between the chemically doped source and drain regions. This induced charge is not neutralized in loco, but it is compensated by the charge on an opposing spaced electrode. In semiconducting devices disclosed in my above-referenced parent applications, there are a plurality of closely spaced inducing electrodes and in these devices it is possible to switch induced charge along the surface of a body between positions opposite to neighboring inducing electrodes.

Copending application Ser. No. 749,651 teaches a structure having three inducing electrodes arranged to have normal projections on a closely spaced away semiconducting surface to form contiguous regions and its use as a bipolar transistor structure.

It is desirable to have a device which may be operated in different modes such as either a bipolar transistor or a unipolar transistor. It is an object of this invention to provide a charge transfer device which can be used as a bipolar or as a unipolar transistor depending upon the applied bias potential.

It is an additional object of this invention to provide an improved charge transfer device for the shift of induced minority charge carriers along the surface of a semiconductor.

It is another object of this device to provide control of the transfer of induced minority charge carriers from one induced region to another along the surface of a semiconductor.

A still further object of this invention is to provide induced regions which are closely spaced in the semiconductor layer.

It is a still further object of this invention to eliminate bulk effects in the semiconductor layer.

SUMMARY OF THE INVENTION

A device having a thin semiconducting layer and an insulating layer on a major surface of the semiconducting layer and at least three separated electrodes on the insulating layer spaced from the semiconducting layer by the insulating layer so that one of the electrodes is intermediate to two other electrodes and each electrode is connected to means for applying a potential to the electrode. The potentials bias the electrodes to induce charges on the surface of the semiconducting material opposing the electrode. The region induced opposite the intermediate electrode is of a narrower width in dimension between its bordering induced regions than its longitudinal dimension parallel to the bordering regions.

A variable biasing means for applying to the electrodes the potentials which induce minority charge carriers in the underlying regions opposite the electrodes including a means for changing the potential distribution among the electrodes so that induced minority charge carriers are shifted from one of the induced regions to another of the induced regions. Further, the means for control includes means for applying an electrical potential to the intermediate electrode which controls the rate of shifting of the induced minority charge carriers through its opposing region.

The arrangement of the adjacent electrodes provides close spacing of adjacent induced regions.

The intermediate electrode is spaced from the semiconducting surface by a spacing of different dimension than the spacing of at least one of the other two electrodes from the semiconducting surface, enabling overlap of the normal projections of at least two electrodes providing contiguous induced charge regions. Bulk effects are minimized by using a sufficiently thin semiconducting layer on an insulating substrate, with means for charge depletion from said semiconducting layer.

More specifically, the semiconductor device is made up of an epitaxial single crystal silicon film on an alumina substrate with a dielectric silicon compound forming the insulating layer on the surface of the single crystal film. The electrodes are positioned on the surface of the dielectric silicon compound layer.

DESCRIPTION OF THE PREFERRED EMBODIMENTS

Figure 1:
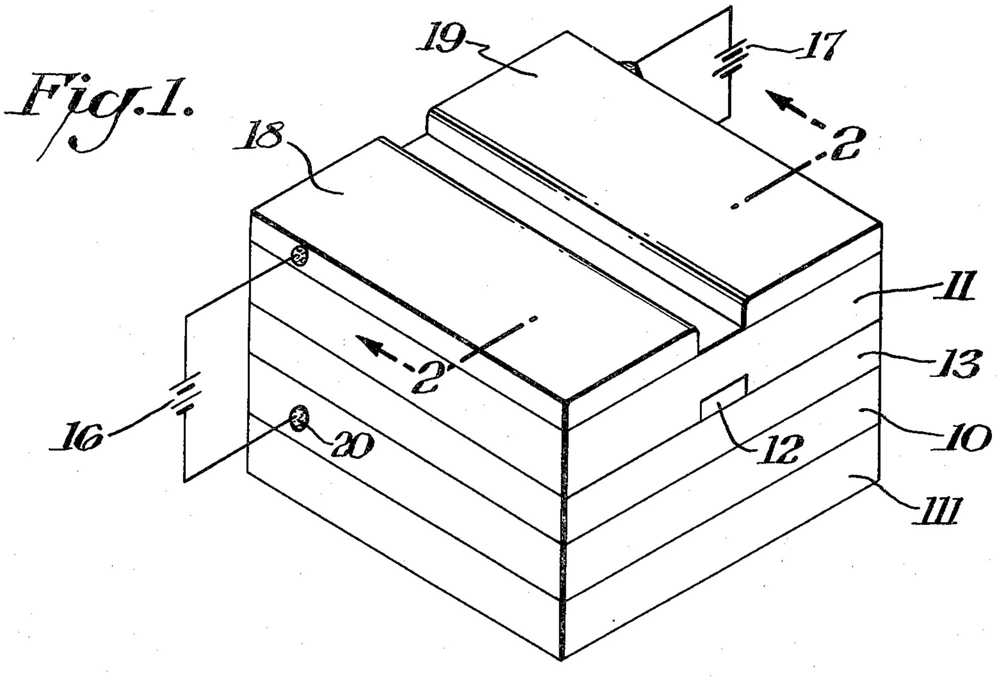
FIG. 1 shows a perspective view of a device formed in accordance with the invention.
Figure 2:
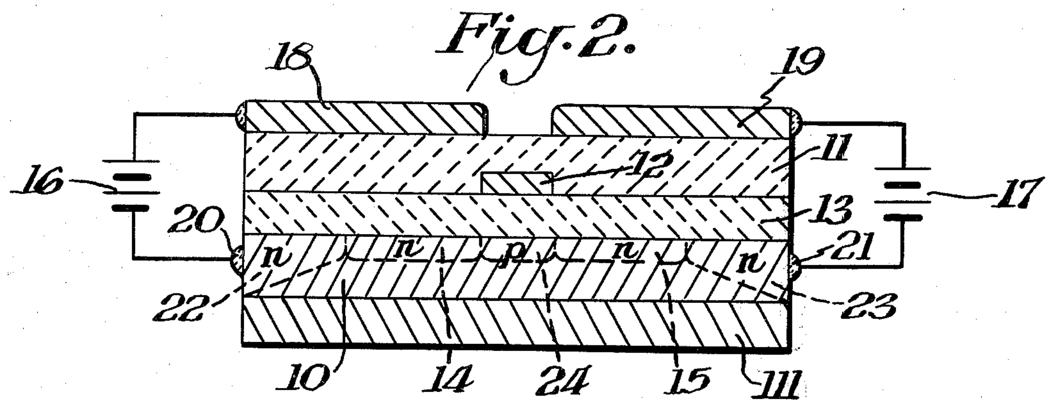
FIG. 2 shows a cross-sectional view of the device taken along line 2—2 of FIG. 1.

FIGS. 1 and 2 show an embodiment of the invention, wherein a lateral n-p-n induced charge transistor is formed. High resistivity, semiconducting layer 10 is deposited on insulating substrate 111. Another insulating layer 13 separates electrode 12 from layer 10. Still another insulating layer 11 overlays 12 and 13 and carries electrodes 18 and 19 on its outer surface. N-regions 14 and 15 are induced in the semiconductor 10 by application of positive potentials from power supplies 16 and 17 to contacts 18 and 19 using terminals 20 and 21. Regions 22 and 23 are chemically doped n-type land areas. P-region 24 is formed by applying negative bias to electrode 12 from a power supply contact and using a land area not shown.

Chemically doped land areas, or more generally contacts to the induced regions, are necessary for d.c. operation. For a.c. or transient operation, capacitive coupling from the inducing electrodes to the induced charge regions is possible and contacts to the induced regions are then not required.

Figure 3:
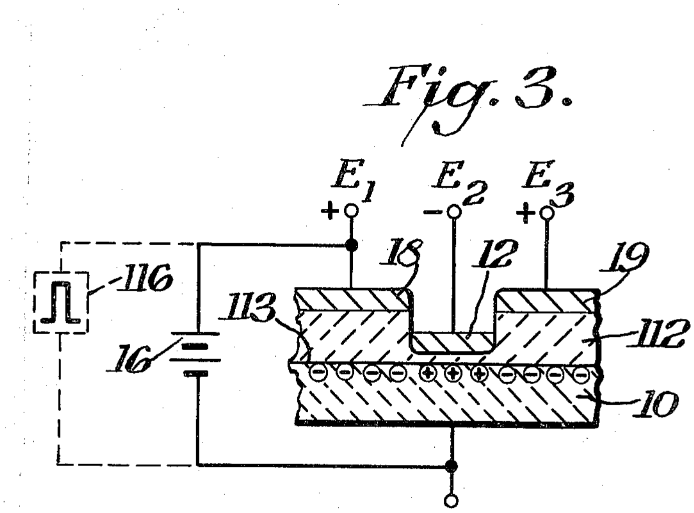
FIG. 3 shows induced charge regions resulting from one potential distribution according to this invention on a device of the type shown in FIGS. 1 and 2.
Figure 4:
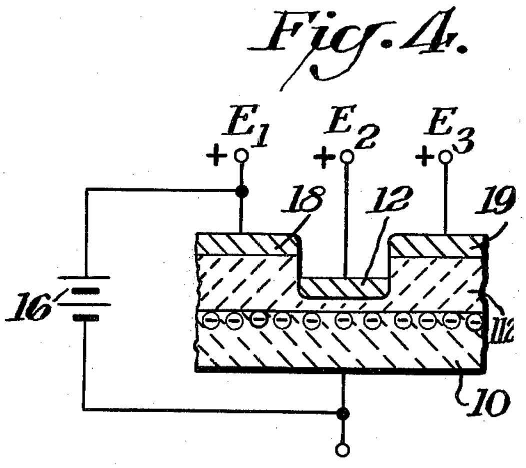
FIG. 4 shows induced charge resulting from another potential distribution according to this invention on a device of the type shown in FIGS. 1 and 2.

FIGS. 3 and 4 show bias conditions applied at the device of the general type as shown in FIGS. 1 and 2, operated as bipolar transistor, FIG. 3, or as unipolar transistor, FIG. 4.

Referring to the structure as shown in FIGS. 3 and 4, there is a semiconducting substrate 10 of p-type, covered by an insulator 112 having one electrode 12 in one plane, and two additional electrodes 18, 19 in another plane, arranged so that the normal projections of the three electrodes 12, 18, 19 on the semiconductor surface 113 are contiguous or even overlap partially.

The two outer electrodes 18, 19 are biased positively to induce n-regions on the underlying p-type substrate 10. The middle electrode can be biased either negatively to induce a p-region sandwiched between the induced n-regions, as shown in FIG. 3, or else biased positively to induce an n-region bridging the gap between the two outer induced n-regions, as shown in FIG. 4.

We thus have either a bipolar n-p-n configuration, FIG. 3, or else a unipolar n-channel configuration, FIG. 4, depending on the voltage $E_2$ applied to the middle control electrode 12. These structures correspond to the lateral n-p-n and to the n-channel insulated gate field effect transistors, respectively, of the chemically doped variety.

In transistor device operation, electrons are transferred from an emitter or source to a collector or drain by crossing an interposed base or channel region. In our surface charge transfer devices of FIGS. 3 and 4, we may broadly speak of an emitter or source well and a collector or drain well located on the surface 113 and opposing the electrodes 18 and 19, said wells separated by a barrier located at the surface 113 opposite to the middle electrode 12 and having a height, width and other properties controlled by the potential $E_2$ applied at the middle electrode 12.

In order that electrons cross this barrier, there must be i. a driving force, i.e., a difference in the floating potentials of induced charge in the emitter and collector wells and ii. the barrier must be sufficiently narrow that transit time of electrons is shorter than their lifetime in the barrier region.

The concept of a floating potential for the induced charge is briefly explained in what follows:

An induced charge at the substrate surface 113 ($z = 0$) has the electrostatic potential $$V_S = (\epsilon\epsilon_o)^{-1} \int_o^d \sigma z dz \qquad (1)$$

with respect to the bulk ($z = d$) of the substrate. This is due to the fact that the induced charge is separated by a space charge ($\sigma$) layer of width $d$ from the underlying substrate. This electrostatic potential must not be confused with the electromotive force U, which is closely related to the free energy difference between surface and bulk and contains a statistical (entropy) contribution $$V_D = kT/q \ln n_s/n_b \qquad (2)$$

called the diffusion potential, where $n_s$ is the electron concentration at the surface 113 and $n_b$ that in the bulk of 10. The floating potential of the induced charge is $$U = V_S + V_D \qquad (3)$$

In thermal equilibrium, the floating potential is zero, the electrostatic potential compensating the diffusion potential.

If the induced charge layer is contacted through an opening in the insulator, e.g. using a chemically doped land area, and this contact is given the floating potential of the induced charge layer, the equilibrium will not be disturbed and lateral charge transfer will not take place. However, if the potential of the contact is not that pertaining to the equilibrium induced charge, a shift of induced charge will be caused. Lateral flow of induced charge is caused by a suitable lateral floating potential distribution U($x$), due to either impressing different U-values on various induced regions through contacts, or else operating under pulsed voltage conditions to the inducing electrodes generating non-equilibrium transients.

Pulse generator 116 in FIG. 3 illustrates means for applying transient voltage conditions at emitter or source contact 18 and similar means are to be applied to electrodes 12 and 19, when necessary.

Figure 5A:
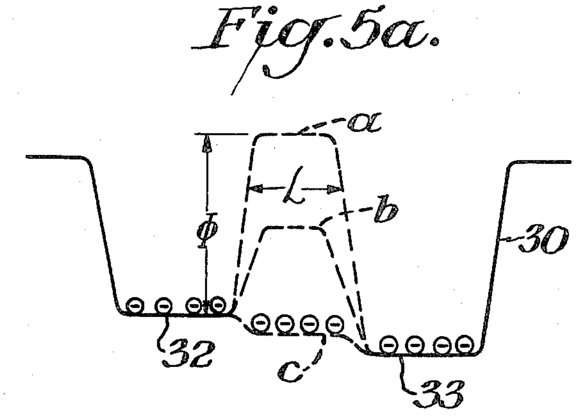
FIG. 5 shows an energy level diagram representative of conditions illustrated in FIGS. 3 and 4.
Figure 5B:
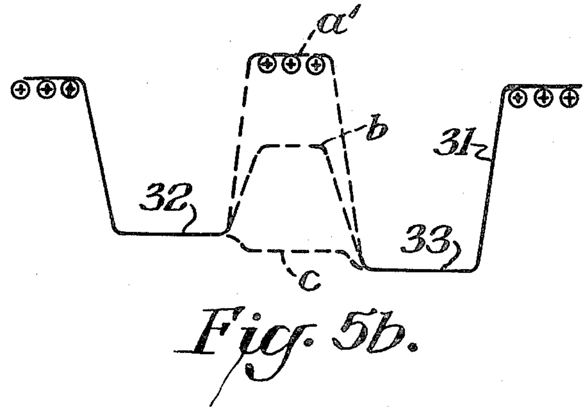

FIG. 5 is an energy level diagram for that section of the semiconductor surface 113 of FIGS. 3, 4 which includes the potential wells and the barrier. Line 30 represents the bottom of the conduction band for electrons and line 31 represents the top of the valence band. Line 32 is the emitter or source well induced by the potential $E_1$ applied at the electrode 18 and 33 is the collector or drain well induced by the potential $E_3$ applied at the electrode 19 of FIGS. 3 or 4. The barrier is designated in FIG. 5 by $a$, $b$ or $c$ for three different cases of potential $E_2$ applied to the electrode 12.

The transfer rate of electrons from emitter well to collector well is limited by the emission rate of electrons from the emitter well into the barrier region. The emission rate is mainly governed by the barrier height Φ marked for case $a$ in FIG. 5, which can be varied in wide ranges by the potential applied at the control electrode 12. Thus, the device of FIG. 3, corresponds to a vacuum diode of electrically variable work function of the cathode. In the case of emission rate limitation, one has $$i_e \simeq N_s qv \exp(-\Phi/kT) \quad (4)$$

where $v$ is the thermal velocity of electrons in the emitter well and $N_s$q the induced charge density in the emitter well. This corresponds to an emission transfer time constant $$\tau_e = (L/v) \exp(-\Phi/kT) \quad (5)$$

where $L$ is the width of the emitter well marked in FIG. 5.

If the potential $E_2$ of electrode 12 is changed from a positive value corresponding to the barrier $a$ of FIG. 5, to a negative value corresponding to line $c$, the barrier is wiped out, and the transient time $\tau_T$ of electrons through the intermediate regions of width $L$ becomes transfer rate-determining.

Transit occurs, in general, by a combination of diffusion and of drift in a field component ($F_x$) parallel to the surface. Thus transit time $\tau_T$ is about equal to the smaller one of $\tau_{diff}$ and $\tau_{drift}$, where $$\tau_{diff} = L^2/[2\mu kT/q] \quad (6)$$

and $$L/v_s < \tau_{drift} < L/(\mu F_x) \quad (7)$$

here $\mu$ is the low field drift nobility; $v_s$ is the saturation drift velocity; and $k$T/q is the voltage equivalent of temperature which is 25 $m$V at room temperature. Considering that the field $F_x$ is of the order of the difference of electrostatic potentials of the well regions, divided by barrier width, i.e.

$$F_x = [V_s(2) - V_s(1)]/L \quad (8)$$

it appears that drift transit time will be more effective than diffusive transit time if $$V_s(2) - V_s(1) > 2kT/q \quad (9)$$

which is usually satisfied in non-equilibrium cases. A typical width of $L$ for a high frequency charge transfer device according to this invention is 2 microns for the case of a silicon body operating at room temperature.

Figure 6:
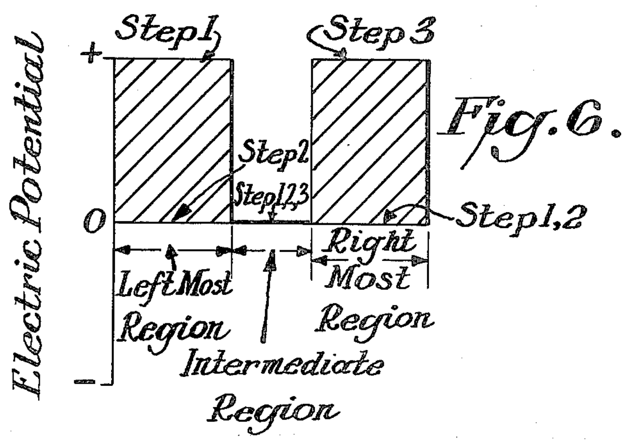
FIG. 6 illustrates potentials applied in sequence to a device of this invention in transient mode operation.

The charge transfer from emitter well to collector well by pulsed operation of the voltages applied at the inducing electrodes 18, 19 is illustrated in FIG. 6. For sake of clarity of presentation, charge transfer is considered in two distinct steps; first, the transfer of charge from the emitter well into the base or barrier region; secondly, the collection of injected charge by the collector region.

This sequence was already discussed in U.S. Pat. No. 3,473,032, for a structure without control electrode for the barrier.

The initial condition, designated as step 1, involves a positive potential applied at electrode 18 to hold induced electrons in the emitter well. If this potential is removed (step 2), the larger value of electron surface concentration, $n_s$, in the emitter well causes a gradient of U according to Equations (2) and (3), which injects the electrons into the adjoining intermediate or barrier region.

An increase of the positive potential applied at electrode 19 (step 3) creates a collector well which collects the electrons from the intermediate region.

Step 3 must follow step 2 at a time not later than the lifetime of electrons injected into the intermediate region, and should preferably occur simultaneously or previous to step 2. Note that the base potential need not necessarily be changed as the interest is only in potential differences between adjacent regions to promote current flow, and such differences can be generated by changing emitter or else collector potentials instead of changing the base potential.

Figure 7:
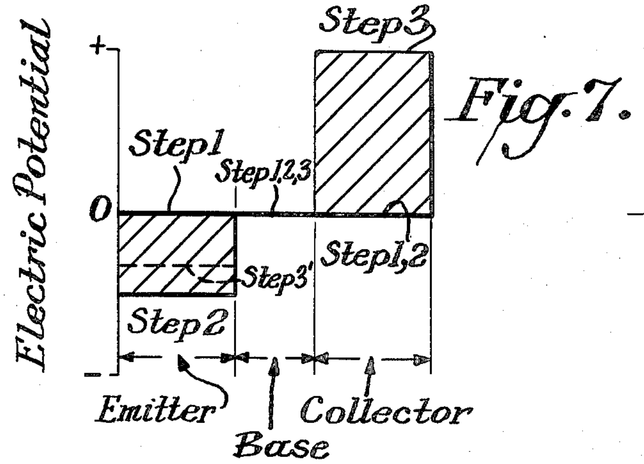
FIG. 7 illustrates the corresponding potentials applied in sequence to a prior art chemically doped n-p-n transistor.

For comparison purposes, FIG. 7 is a chart which shows the sequence of potentials applied to the emitter, base and collector regions of a chemically doped n-p-n transistor to promote a charge transfer from emitter to collector. The chart of FIG. 7 indicates the electric potential on the ordinate and the spacing of the transistor regions on the obscissa. The chart traces the changes in potential in the various regions during the sequence of steps. Starting for convenience from step 1 being thermal equilibrium indicated as potential zero for all three regions, we first change the emitter to a more negative potential to inject electrons into the base. During this step 2, the base and collector regions remain at 0 potential; next we change the collector to a more positive potential to collect the electrons by the collector. During this step 3, the emitter can be switched back to a less negative potential, 3′ or even to the original potential zero, without competing with the collector.

The sequence of potentials shown in FIG. 7 is analogous to those of FIG. 6, except that in step 1 of FIG. 6 a positive holding potential is applied to the inducing electrode facing the region from which the carriers are shifted in order to compensate for the electron charge. In the chemically doped conventional n-p-n transistor the negative electron charge in the emitter is compensated by the positive charge of ionized impurities in the emitter region.

By plotting the changes of the electrode potential facing the left-most region of FIG. 6, from the initial condition step 1, exact analogy to steps 1 and 2 of FIG. 7 is obtained. As is well known, part or all of the holding potential can be generated by fixed charges residing in the oxide or in surface states, or else by an appropriate work function difference between the metal electrode 18 and the semiconductor 10.

Presence of a control electrode for the barrier interposed between emitter and collector wells has several important advantages; namely:

i. It enables control of transfer rate, particularly when this rate is limited by emission from the emitter well over a barrier of finite height Φ.

ii. It enables control of lifetime of electrons in the barrier region: lifetime is known to depend on the surface potential which can be controlled by a potential applied to the barrier inducing electrode.

iii. In a chain of spaced inducing electrodes as shown in FIG. 8 where an induced emitter region is faced on each side by a collector region, unilateral flow of emitted charge can be accomplished by inducing different barrier heights on the two barriers separating the emitter from the two neighboring collectors.

Figure 8:
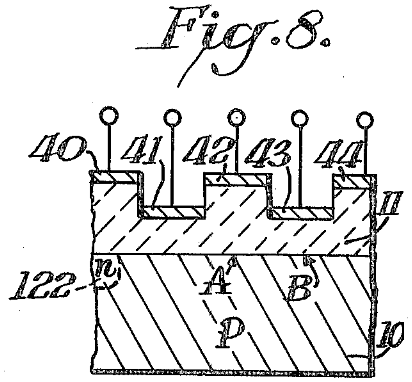
FIG. 8 shows a cross-sectional view of an embodiment of this invention having a chain of spaced inducing electrodes.

Referring to FIG. 8 there is shown the p-type semiconducting silicon substrate 10 covered by an oxide film 11. The oxide film carries on its outer surface a multiplicity of electrodes 40–44. Time-variable electric biasing means for these electrodes are provided but have not been shown in FIG. 8.

Figures 9A, 9B, 9C:
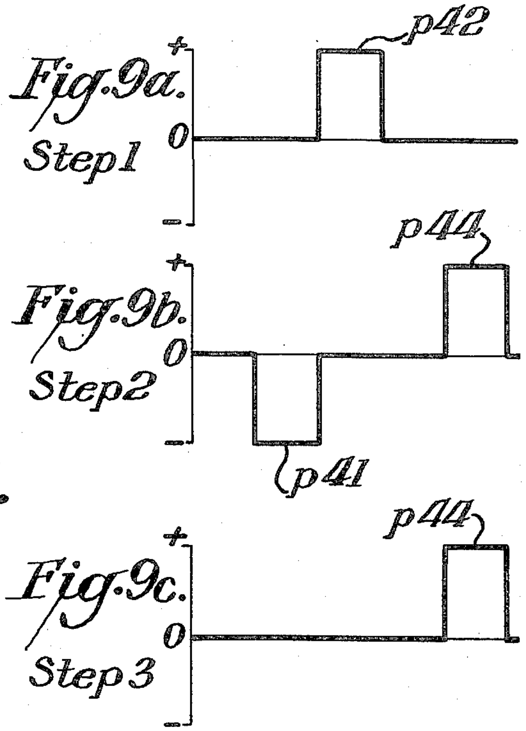
FIGS. 9a-c are graphs showing the sequence of the potentials used in transient operation of the device of FIG. 8.

FIG. 9 ($a$–$c$) shows the potential sequence applied to shift an induced n-region from point A, step 1 to point B, step 3. During the intermediate step 2, unequal potentials are applied to the electrodes 41 and 43 which control the two barrier heights adjacent to the induced region at A. While the potential of 42 is reduced to expel the induced charge from A, the potential of 41 is shifted to a more negative value (step 2) thereby preventing flow of electrons to the left, forcing the electrons to the right into region B. This is aided by the positive potential applied to 44.

The carrier concentration of an induced charge layer in thermal equilibrium establishes itself by thermal generation of electron-hole pairs. This is a more or less slow process. If a continuous, ample supply of carriers is required, e.g., for d.c. operation, additional means of carrier generation or carrier supply are required. Such means may consist in supplying carriers from a neighboring doped region; or else generation of electron-hole pairs by a high electric field avalanche effect in the depletion layer (e.g. by pulse voltage generator 116 in FIG. 3) or by illumination using a suitable light pulse, as already pointed out in U.S. Pat. No. 3,473,032.

Unlike transient, a.c. or pulse operations which do not require contacts to the induced charge regions, d.c. operation requires such contacts for continuous current flow. Conveniently, these contacts are made through openings in the insulator film to chemically doped land areas contiguous with the induced regions. Such land areas are shown in FIG. 2, regions 22 and 23, and FIG. 8, region 122.

Advantages of induced charge transistors made as shown in FIGS. 3 and 4 for d.c. operation include the control by means of the potentials applied to the inducing electrodes of i. base width, base current amplification and of minority carrier lifetime in the base region for a bipolar transistor; and ii. of channel length for a unipolar transistor.

Figure 10:
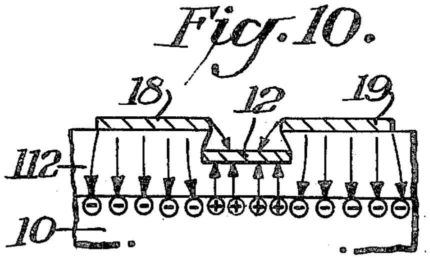
FIG. 10 is a cross-sectional representation of the electrostatic potential distribution in the insulator separating the semiconducting body from the inducing electrodes in a device of this invention.

Base width or channel length are controlled by the electrostatic potential distribution in the insulator 112 due to the potentials $E_1$, $E_2$ and $E_3$ applied at the control electrodes 18, 12 and 19. With increasing positive potential applied at the outer emitter or source electrode 18 and the collector or sink electrode 19 the width of the base or channel shrinks due to electrostatic reach-through of field lines as shown in FIG. 10 for a n-p-n configuration. This enables preparation of lateral bipolar transistors and of insulated gate field effect transistors of practically zero base width or channel length with correspondingly good high frequency performance. Moreover, the base width or channel length are electrically controlled and related properties such as high frequency cut-off can thus be varied.

It is a feature of this invention that base current amplification of the bipolar configuration is electrically controlled primarily by the carrier concentrations in the induced charge layers. Lifetime of injected carrier in the base layer or more generally in the barrier region is controlled by the surface potential, which in turn depends on the potential applied to the middle electrode 12.

The structures encompassing three adjacent regions can be expanded to larger numbers of adjacent regions. Some of these regions can be chemically doped and others electrically induced, thus generating a wide range of possibilities.

This invention involves the creation of an induced circuit path along the induced regions.

Ideally, this path should have zero leakage between the induced regions and the rest of the semiconducting film 10. The parent application called for a high resistivity semiconducting material which would provide good insulation around the induced regions. For some circuit applications silicon, at room temperature, and in the thickness ordinarily used, is not sufficiently insulating to meet this requirement. By using an extremely thin film of silicon, as taught herein, this leakage current is reduced significantly from that of a thicker silicon body having the same impurity concentration. The leakage can be reduced still further by extending the induced region through film 10 to substrate 111 thereby reducing the contact area between an induced inversion region and the surrounding conducting body of the film. This is accomplished as follows. Suppose that the semiconductor film has a concentration of $3 \times 10^{15}/cm^3$, of donor type impurities, for example, phosphorus in silicon. At room temperature all these impurities would be ionized and their charge would be compensated by $3 \times 10^{15}$ free electrons per $cm^3$, providing a conductivity of about 0.6 $ohm^{-1}$ $cm^{-1}$.

If the positive terminal of a stationary electric field impinges on one of the flat surfaces of such a film, electrons will be removed from a surface layer of thickness $d$ of the slice. This thickness $d$ increases with the field up to an amount $d_\infty$; with further increasing field, $d_\infty$ remains nearly unchanged and p-conductance by a surface layer of holes arises. For a slice having a uniform concentration of donor type impurities N, the thickness $d_\infty$ is given by the approximate relation $$d_\infty \simeq 2\sqrt{(kT/q)\ \ln\ (N/n_i)\epsilon_s\epsilon_o/Nq} \qquad (10)$$

where kT/q is the voltage equivalent of temperature (1/40 volt at room temperature); $\epsilon_s$ is the dielectric constant of the semiconductor; $\epsilon_o = 8.84 \times 10^{-14}$ amp sec/volt cm: $n_i$ is the intrinsic carrier concentration of the semiconductor, and $q = 1.6 \times 10^{-19}$ coulombs, the elementary charge. For silicon at room temperature, $\epsilon_8\epsilon_0 \simeq 10^{-12}$ amp sec/volt cm and assuming $N \simeq 3 \times 10^{15}$ $cm^3$, one obtains $d_\infty \simeq 0.5$ microns. Thus, $Nqd_\infty \simeq 2.5 \times 10^{-8}$ $coul/cm^2$, and the electric field at the semiconductor surface is $F_s \simeq Nqd_\infty/\epsilon_s\epsilon_o = 2.5 \times 10^4$ $V/cm$.

From the above quoted example, full depletion of electrons is only possible if the film thickness is less than 0.5 microns. 3 course, in a film doped by less than $2 \times 10^{15}/cm^3$ a correspondingly larger film thickness can be depleted.

The depletion field $F_s$ of $2.5 \times 10^4$ V/cm can be produced in a variety of ways. One is the external application of an electrical field to a metal electrode separated from the semiconductor by an insulator.

If a transient electric field impinges on the surface of an n-type semiconductor, there may well be insufficient time to generate a hole inversion charge at the surface, and the width of the electron depletion layer can be temporarily much larger than the equilibrium width $d_\infty$ given by Eq. (10).

What is claimed is:

1. i. In a semiconductive body containing a first, second and third chemically doped zone, said first and third zones of a first conductivity type, and said second zone of the opposite conductivity type, said first and third zones spaced from each other along a surface of said body, a plurality of electrical contacts formed on said first, second and third zones;

ii. a set of at least three electrical contacts in close proximity to said surface, said electrical contacts insulated from each other and from said underlying semiconductive body, said set of electrical contacts arranged so that their normal projections on said underlying surface of said semiconductive body form a set of contiguous regions, so that regions are sandwiched between preceding and succeeding regions, the first region of said set being contiguous with said first chemically doped zone, the last region of said set being contiguous with said third chemically doped zone;

iii. means for applying electrical potentials to said electrodes of said set so as to induce electrical charges in their respective underlying regions, wherein at least three consecutive regions of said set have the first and third of said consecutive regions consisting of the first conductivity type and said intermediate second consecutive region consisting of the opposite conductivity type, whereby induced charges of said first conductivity type emitted from said first consecutive region through said second consecutive region of opposite conductivity type into said third consecutive region of said first conductivity type and are collected in said third region to provide lateral current flow from said first chemically doped zone to said third chemically doped zone along said induced charge regions.

* * * * *

UNITED STATES PATENT OFFICE

CERTIFICATE OF CORRECTION

Patent No. 3,921,193 Dated November 18, 1975

Inventor(s) Kurt Lehovec

It is certified that error appears in the above-identified patent and that said Letters Patent are hereby corrected as shown below:

Column 8, line 45, "3" should read -- Of --

Column 8, line 46, "2 x $10^{15}/cm^3$" should read -- 3 x $10^{15}/cm^3$ --

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*